United States Patent [19]

Vismara

[11] Patent Number: 5,304,050
[45] Date of Patent: Apr. 19, 1994

[54] MACHINE FOR MOLDING BONDED PLASTICS MATERIAL

[75] Inventor: Mario Vismara, Casatenovo, Italy

[73] Assignee: Devi S.p.A., Besana Brianza, Italy

[21] Appl. No.: 876,384

[22] Filed: Apr. 30, 1992

[30] Foreign Application Priority Data

May 3, 1991 [IT] Italy .................... MI91 A 001214

[51] Int. Cl.⁵ .................. B29C 39/10; B29C 45/14
[52] U.S. Cl. ...................... 425/4 R; 425/112;
425/122; 425/126.1; 425/139; 425/168;
425/215; 425/553; 425/554; 425/556; 425/593;
425/292; 425/395; 425/397; 425/403.1;
425/436 R; 425/436 RM; 425/451.6; 425/454
[58] Field of Search ............... 425/117, 122, 215, 4 R,
425/817 R, 395, 388, 397, 407, 553, 554, 556,
451.6, 553, 454, 126.1, 292, 403.1, 436 R, 436
RM, 451.6, 451, 112, 168, 593; 156/500

[56] References Cited

U.S. PATENT DOCUMENTS

| 4,105,736 | 8/1978 | Padovani | 425/388 |
| 4,464,329 | 8/1984 | Whiteside et al. | 425/388 |
| 4,994,224 | 2/1991 | Itoh et al. | 425/126.1 |

FOREIGN PATENT DOCUMENTS

| 0103377 | 3/1984 | European Pat. Off. |
| 2709450 | 5/1978 | Fed. Rep. of Germany . |
| 3604175 | 8/1986 | Fed. Rep. of Germany . |
| 3637660 | 5/1987 | Fed. Rep. of Germany . |
| 1185507 | 11/1987 | Italy . |
| 1324611 | 7/1972 | United Kingdom ............ 425/451 |
| 1447110 | 8/1976 | United Kingdom . |
| 2160148 | 12/1985 | United Kingdom . |

Primary Examiner—Khanh Nguyen
Attorney, Agent, or Firm—Jacobson, Price, Holman & Stern

[57] ABSTRACT

A machine for molding bonded plastics material, in particular expanded or foamable polystyrene in combination with rigid sheet polystyrene, wherein the rigid material (2) is preformed in a preforming station (1) in a preforming mold (33, 36) while simultaneously separating by a cutter (40) the preformed portion from the rigid sheet of starting material to produce separate preformed pieces, the preformed pieces are moved by a transfer table (27) to a molding station (3) while retained on preforming half-mold (33), foamable material (44) is fed to molding mold (41) and molded and bonded on the preformed pieces with sintering by pulse action of steam (45) and, the final molded articles (P) are discharged at discharge station (6). The half-mold (33) is moved alternately between the preforming station (1) and molding station (3), and cooperates with respective counter-molds (36, 41). The scrap is recovered without being involved in the molding stage. The various parts of the machine are controlled by a control device (14) for continuous synchronous cyclical operation.

18 Claims, 7 Drawing Sheets

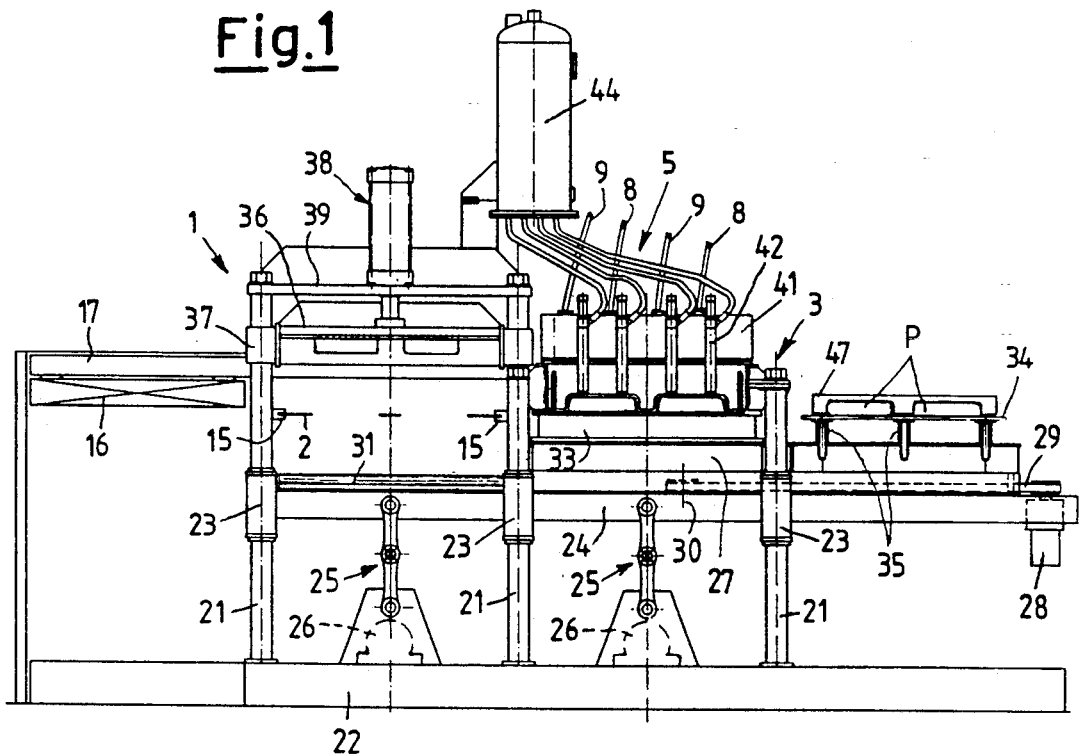
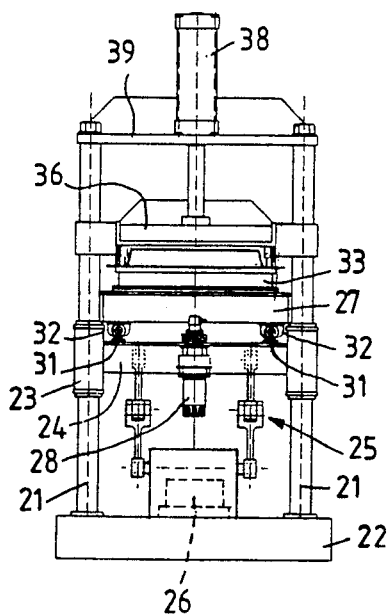

5,304,050

MACHINE FOR MOLDING BONDED PLASTICS MATERIAL

BACKGROUND OF THE INVENTION

This invention relates to a machine for molding bonded plastics material, in particular expanded or foamable plastics material in combination with rigid plastics material, such as expanded polystyrene with rigid sheet polystyrene.

For molding these materials, which requires the application of steam to sinter the expanded or foamable plastics material, with its simultaneous adhesion to the rigid material, it is already known from Italian patent No. 1,185,507 to use a mold consisting of two half-molds which together define a molding cavity for housing the two materials, one of which, namely the more rigid sheet material, is firstly preformed in contact with only the lower half-mold, the other material then being molded onto the first by sintering in the closed mold.

In this method, the rigid sheet plastics material is retained at its end edges and then firstly hot-deformed by moving the relative half-mold beyond the plane of the sheet material, after which the material is made to adhere exactly to the half-mold by creating a vacuum between the half-mold and the material.

The upper half-mold is then lowered and the expanded or foamable plastics material is molded within the resultant cavity, steam being applied in pulses alternating with the application of vacuum, to enable the expanded material to sinter onto the more rigid material.

This known method and apparatus have the advantage of requiring only a single mold consisting of two half-molds movable relative to each other, with resultant constructional advantages.

However, a vacuum application stage for preforming is still required, as otherwise it would not be possible to make the more rigid material adhere perfectly to the shape of the preforming half-mold, there being no corresponding counter-mold in that the one provided has a shape which corresponds instead to the part to be molded in expanded material. Vacuum application alone is not always able to produce the required shape, especially in the case of the more complex mold shapes, as in such cases it is difficult to cause the material to adhere to the mold at every point.

To overcome this difficulty, preforming has to be effected in a mold separate from the main mold, however this complicates the apparatus because of the larger number of components and the consequent more complicated handling of these and of the material. A further drawback of the known method and apparatus is that those portions of the material which are peripherally clamped undergo inevitable alteration during molding and have mostly to be discarded as they cannot be recycled, this representing a substantial material wastage and posing disposal problems.

BRIEF SUMMARY OF THE INVENTION

The object of the present invention is to overcome the drawbacks and limitations of the known apparatus by providing a machine for molding bonded plastics material which does not require a preforming stage effected exclusively by vacuum, and in addition does not require doubling of the mold arrangement, i.e. the provision of one mold for preforming the rigid material and one for molding the foamable or expanded plastics material onto the rigid material, hence resulting in a constructionally and operationally simplified arrangement.

A further object is to provide a machine which enables the scrap material to be recovered without it undergoing alteration during the preforming and/or molding operations. The term "rigid" is to be understood herein in a relative sense, as a material having generally higher intrinsic rigidity characteristics than the plastics material to which it is bonded; this term therefore also covers a material in thin sheet form. These objects are attained according to the present invention by a method for molding bonded plastics material, in particular foamable or expanded plastics material in combination with rigid plastics material, in which the rigid material is firstly preformed and the foamable expanded plastics material is molding onto the rigid material by steam applied in pulses, characterized in that that portion of the rigid material to be preformed is separated from the rigid starting material during the preforming, the preformed material being transferred to the molding stage within the preforming half-mold, the scrap material being conveyed to recovery before the preforming half-mold returns to its preforming position. To implement the invention a machine for molding bonded plastics material is proposed comprising a mold for preforming a rigid plastics material and a mold for molding foamable plastics material onto the rigid plastics material, means for feeding the rigid plastics material to the preforming mold and means for feeding the foamable plastics material to the molding mold, plus means for applying steam in the form of pulses to said molding mold, characterized in that means for separating the portion of material to be preformed are associated with the preforming mold and operate conjointly with the preforming mold, the two molds having a single movable half-mold associated successively in time with relative preforming and molding counter-molds, the rigid plastics material feed means being operable during the molding or movement stage of said half-mold.

The machine of the invention has the advantage of providing perfect preforming in that a counter-mold is used in this stage, and in addition the structure is simplified compared with a machine comprising separate preforming and molding counter-molds, as the present invention uses a single half-mold for both preforming and molding, and only this half-mold has to be moved. As this half-mold moves with only the preformed material portion, and hence separated from the feed material, the scrap can be advantageously carried to recovery without it undergoing any contamination by lubricants, detaching agents, expanded material beads or other substances, so that the scrap can be recycled. In addition the scrap cutting operation after the molding has been unloaded from the machine is eliminated. Special means for clamping the edges of the rigid material are not essential as the half-molds themselves can advantageously clamp the material during preforming, and in addition special means for transferring the preformed material between the molds are not required, as the actual half-mold itself effects the transfer.

BRIEF DESCRIPTION OF THE DRAWINGS

Further details and advantages of the invention will be more apparent from the detailed description of a preferred but not exclusive embodiment thereof given hereinafter and illustrated on the accompanying drawings, wherein:

FIG. 1 is a side elevation of a machine according to the invention;

FIG. 3 is a front elevational view of a part of the machine of the preceding figures, limited to only the preforming mold;

DETAILED DESCRIPTION

Figure 2:
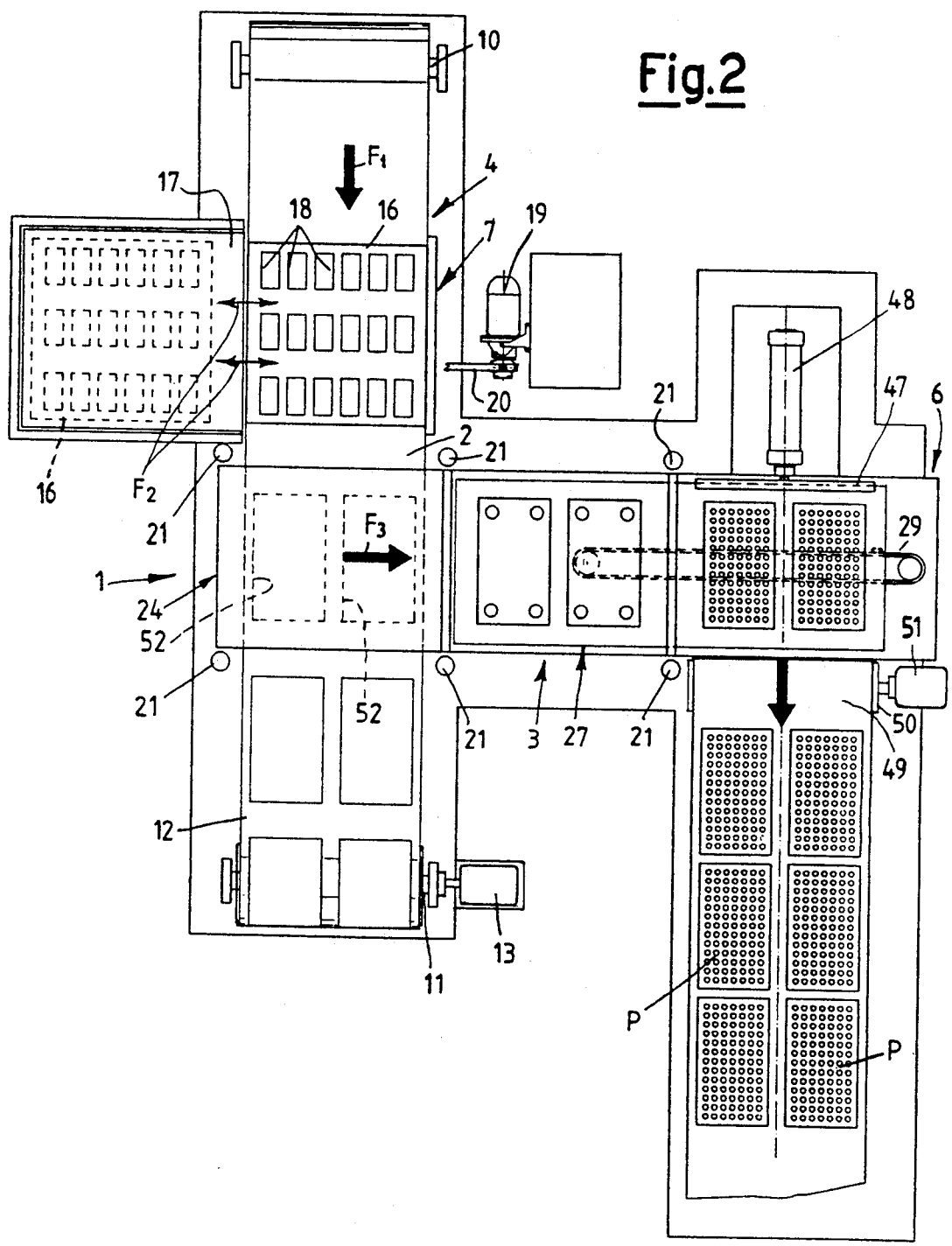
FIG. 2 is a schematic top plan view of the same machine with certain parts removed for simplicity.
Figure 4:
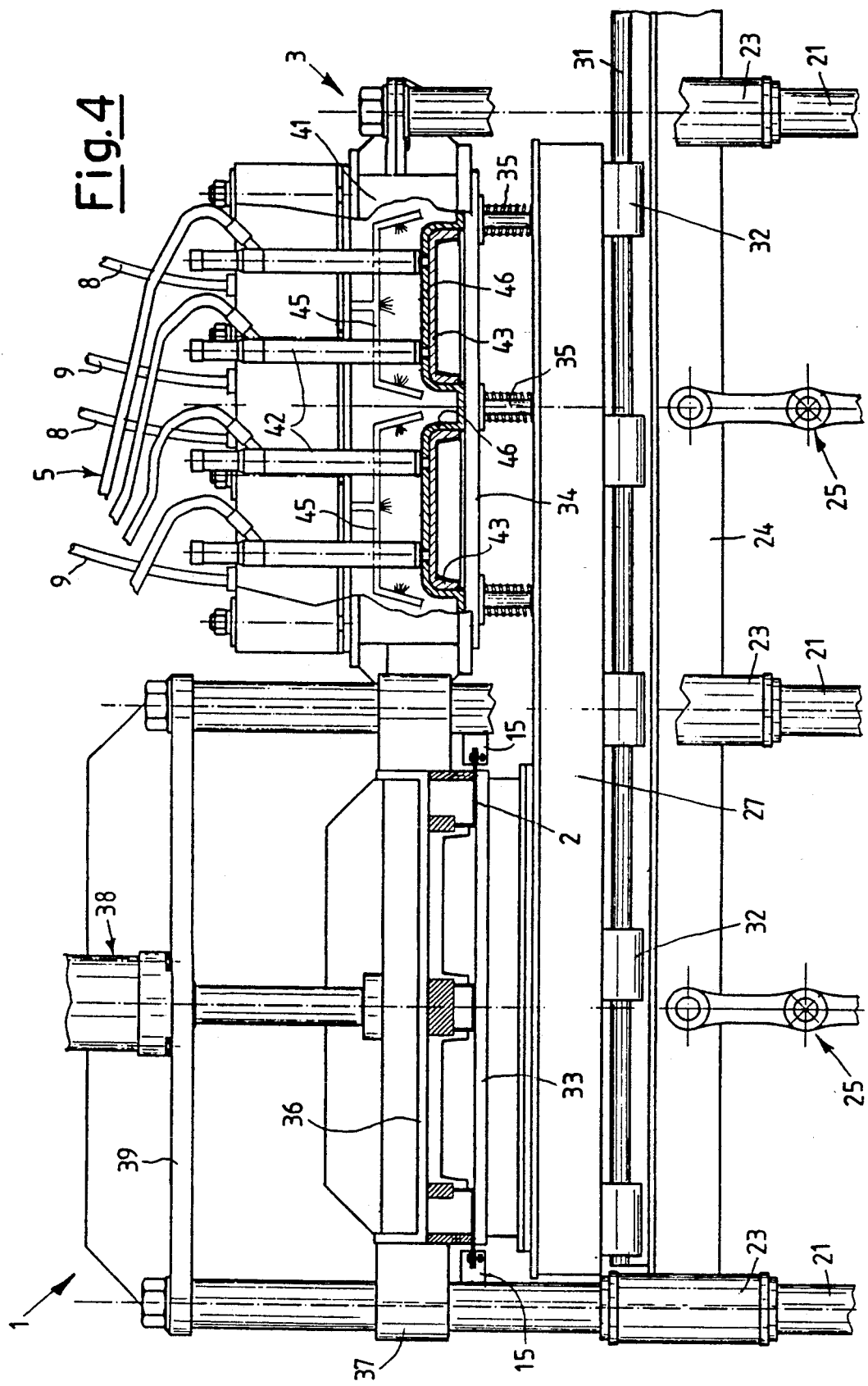
FIG. 4 is an enlarged side elevation of a part of the machine, showing the zone comprising the preforming and molding molds.

With reference firstly to FIGS. 1 to 3, a machine for molding bonded plastics material, such as foamable or expanded plastics material, in particular expanded polystyrene, in combination with a rigid plastics material, in particular rigid sheet polystyrene, includes substantially a preforming station 1 for the rigid plastics material 2, a molding station 3 for molding the foamable plastics material onto the preformed material, a station 4 for feeding the rigid material 2 to the preforming station 1, and means 5 for feeding the foamable plastics material to the molding station 3.

The machine also comprises a discharge station 6 and, if the rigid plastics material 2 requires it, a preheating station 7 positioned upstream of the preforming station 1. The molding station 3 also comprises means 8 for pulse-feeding steam for sintering the foamable or expanded plastics material, in accordance with a known method, for example as described and illustrated in the cited Italian patent 1,185,507 and feed means 9 for a cooling fluid.

Figure 6:
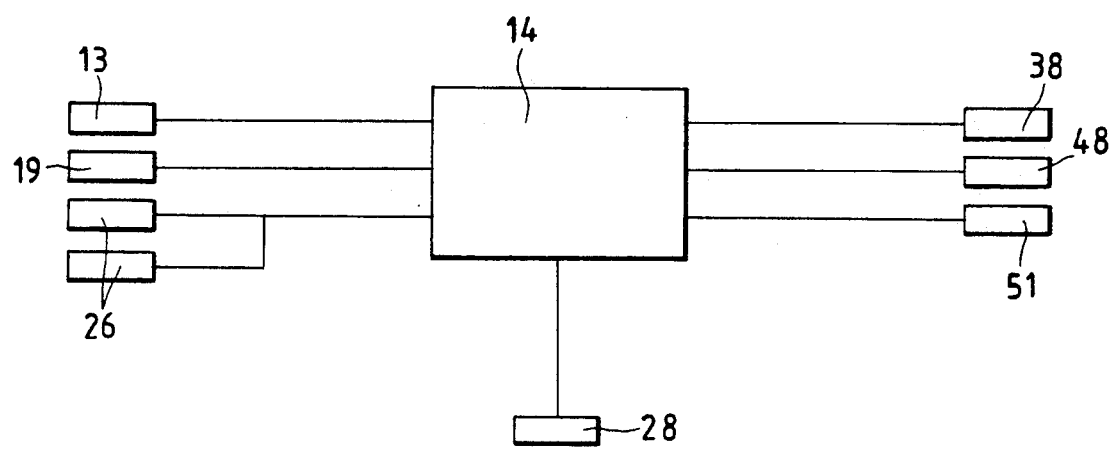
FIG. 6 is a schematic view of the centralized control section for controlling the operations involved in molding a piece of bonded plastics material.

The feed station 4 comprises means for feeding the rigid plastics material 2, consisting essentially of a roller 10 for unwinding the material 2 and a roller 11 for winding the scrap 12, the roller 11 being rotated intermittently by a motor 13 controlled by a control center indicated schematically by 14 (see FIG. 6). The material 2 is guided by guide means 15 at least at the preforming station 1, and advances in the direction of the arrow F1.

The preheating station 7 is preferably formed from a preheater 16, in particular of infrared type, supported and guided transversely (arrows F2 in FIG. 2) to the direction of movement of the continuous material 2 by a guide member 17 between an operating position overlying the material 2 (position indicated by full lines in FIG. 2) and a rest position offset to the side thereof (position indicated by dashed lines in FIG. 2). The number of heater elements 18 and/or their power and/or the residence time of the preheater 16 above the material 2 are obviously chosen according to the material and the preforming requirements. The preheater 16 is driven for example by a motor 19 and a belt 20 which is connected at one point to the preheater and deviated about a fixed shaft supported in position within the structure 17. The motor 19 is also controlled by the control center 14. The preforming station 1 and molding station 3 comprise substantially a plurality of spaced-apart vertical columns 21 fixed to a plate-type base 22 and along which there slide relative sleeves 23 with which there is rigid a horizontal platform 24, which can therefore be raised and lowered vertically, for example by means of toggle mechanisms indicated overall by 25, driven in pairs by respective motors 26 which are also controlled by the control center 14.

A table 27 of length substantially equal to the longitudinal horizontal dimension of the two stations 1 and 3 is slidable horizontally on the support 24 in the direction of the arrow F3, i.e. substantially perpendicular to the direction of advancement F1 of the rigid material 2 in the illustrated embodiment. The table 27 is driven by a motor 28 via a belt 29 connected to a point on the table 27 and deviated about a fixed shaft 30, the table 27 being guided on longitudinal guides 31 fixed to the support 24 and slidingly engaged by respective slide blocks 32 of the table 27 within the two rows of columns 21.

The table 27 carries on its left side (FIG. 1) a preforming half-mold 33 and on its right side a resting platform 34, possibly spring-loaded (springs 35), for the molded pieces P. The preforming half-mold 33 cooperates in the preforming station 1 with a counter-mold 36, which in the illustrated embodiment is vertically movable via sleeves 37 slidable on the columns 21, but could also be fixed. The configuration of the facing impressions of the half-mold 33 and counter-mold 36 is such that when in the preforming position, i.e. with the mold closed, they define a preforming cavity corresponding to the shape to be given to the preformed portion of material 2. The counter-mold 36 is movable for example hydraulically by means of a cylinder-piston unit 38, of which the cylinder is fixed to a cross-member 39 of the preforming station 1, and the piston is connected with the counter-mold 36. Its operation is controlled by the control center 14. The half-mold 33 can be provided with temperature control systems and with systems for applying a vacuum to the impression, via suitable passages.

Figure 5:
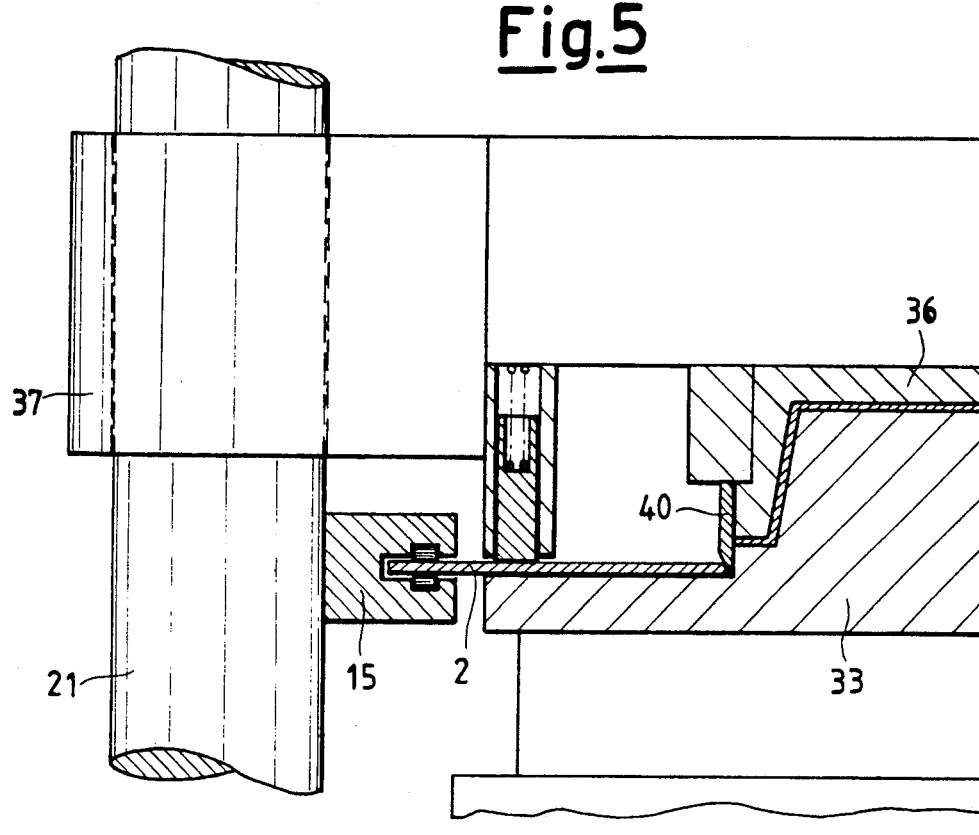
FIG. 5 is a part cross-sectional view an a larger scale than the preceding figures showing a part of the preforming mold at the moment of preforming.

According to one characteristic of the invention, separation or cutting means, best visible in FIG. 5, are associated with the counter-mold 36 and consist of blades 40 arranged in such a manner as to separate from the rigid material 2 the portion to be preformed, by cutting it away peripherally during the preforming stage, as described hereinafter.

The molding station 3 is formed from a fixed half-mold 41 of known type for molding foamable material by steam pulses, for example as described in the cited Italian patent 1,185,507. The drawing therefore illustrates only some generally typical components of this mold, such as the feeders 42 for the material 43, connected to a material container 44, the steam feed pipes 8 and the cooling pipes 9 which terminate in sprayers 45.

Condensate discharge means and means for creating a vacuum in the molding cavity are also provided. The reference numeral 46 indicates the impression which cooperates with the impression in the preforming half-mold 33 to define the molding cavity for the two bonded materials (rigid+expanded). Said mold also comprises expulsion devices, of known type and therefore not shown in detail, for discharging the molded pieces P.

To the side of the molding station 3 there is a discharge station 6 comprising substantially a pusher element 47 operated for example pneumatically by a cylinder-piston unit 48 controlled by the control center 14 in a direction perpendicular to the direction of movement of the table 27, and a conveyor belt 49 or other conveyor device. The conveyor belt 49 has its upper branch at the level of the resting platform 34 (when the table 27 is in its raised position), on which the pusher 47 also operates, so that the belt 49 receives the molded pieces P from said platform 34 and conveys them to a collection device, not shown, in a direction parallel to the feed direction of the material 2. The belt 49 winds about a roller 50 and is driven intermittently by motor means 51 together with the pusher element 47.

As shown schematically in FIG. 6, all the drive members for moving the various previously described movable elements of the machine are controlled by control center 14 in a predetermined sequence, as will now be described with reference to FIGS. 7 to 12.

Figure 7:
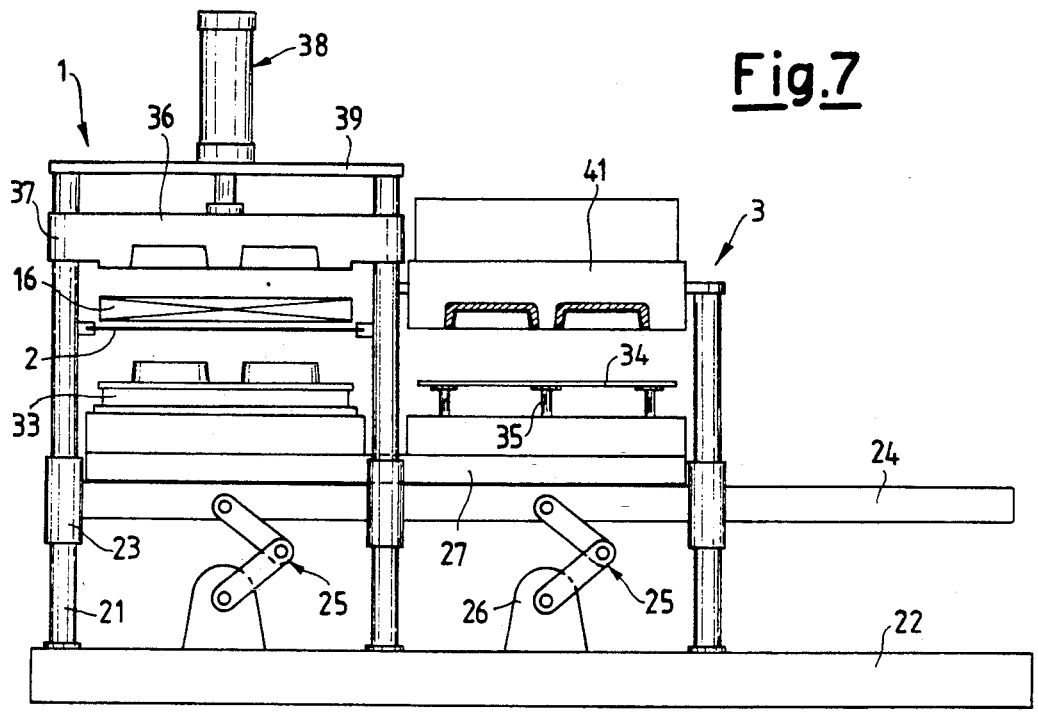
FIGS. 7, 8, 9, 10, 11 and 12 are schematic side elevational views of part of FIG. 1 on an enlarged scale showing the successive operating stages in obtaining a piece of bonded plastics material by the machine of the invention.

The first stage in the molding of the bonded material is the preforming of the rigid plastics material 2. For this purpose the material 2 in strip form is fed through one step and, if necessary, preheated below the preheater 16 positioned in its operating position for a predetermined time, after which the preheater is withdrawn into its rest position. FIG. 7 schematically illustrates the situation slightly before preforming.

Figure 8:
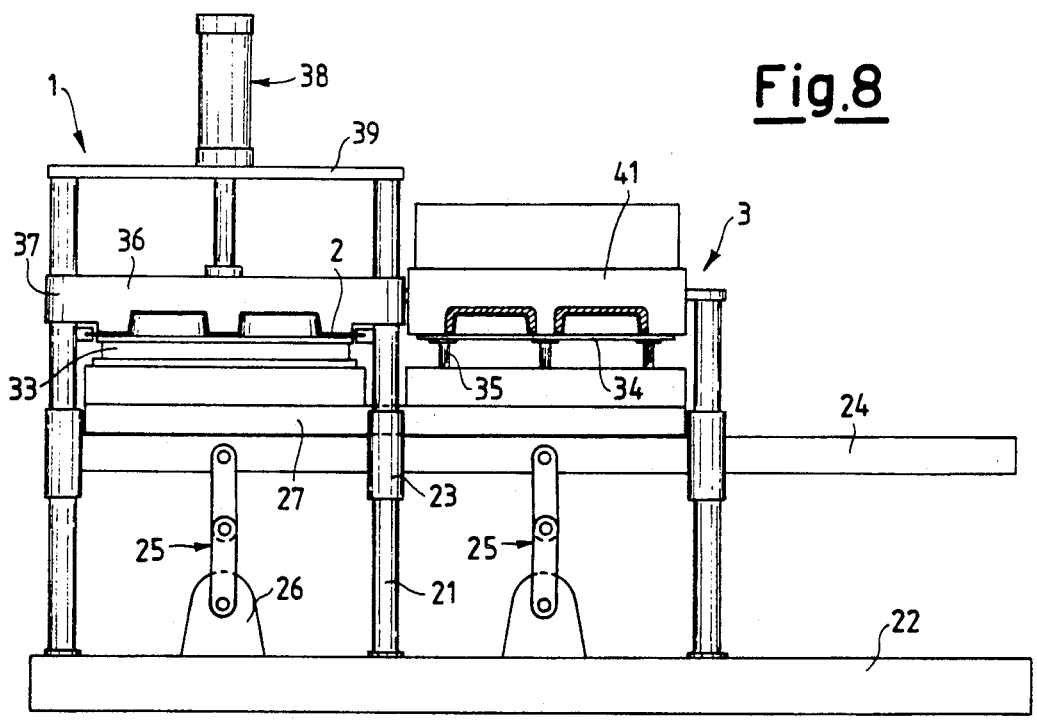

With its next step the material 2 reaches its preforming position in the relative mold 1. The motors 26 and the hydraulic device 38 are operated simultaneously by the control center 14/to bring the two half-molds 33 and 36 into contact with each other substantially in the plane of the material 2 (FIG. 8). This is deformed into the shape of the impressions of the two half-molds, the preformed portion being simultaneously cut away from the material strip 2 along a perimetral line by the blades 40 (FIG. 5). In the illustrated example two pieces are preformed simultaneously, so that two portions 52 are cut away from the strip (FIG. 2), while the scrap 12 remains in a continuous piece and with the subsequent advancement steps of the material 2 is wound onto the roller 11, and can be advantageously recycled after suitable treatment. During the preforming, for which it may be convenient to use vacuum even though this is not essential, the previously molded piece P is retained in the fixed half-mold 41, present in the molding mold 3.

Figure 9:
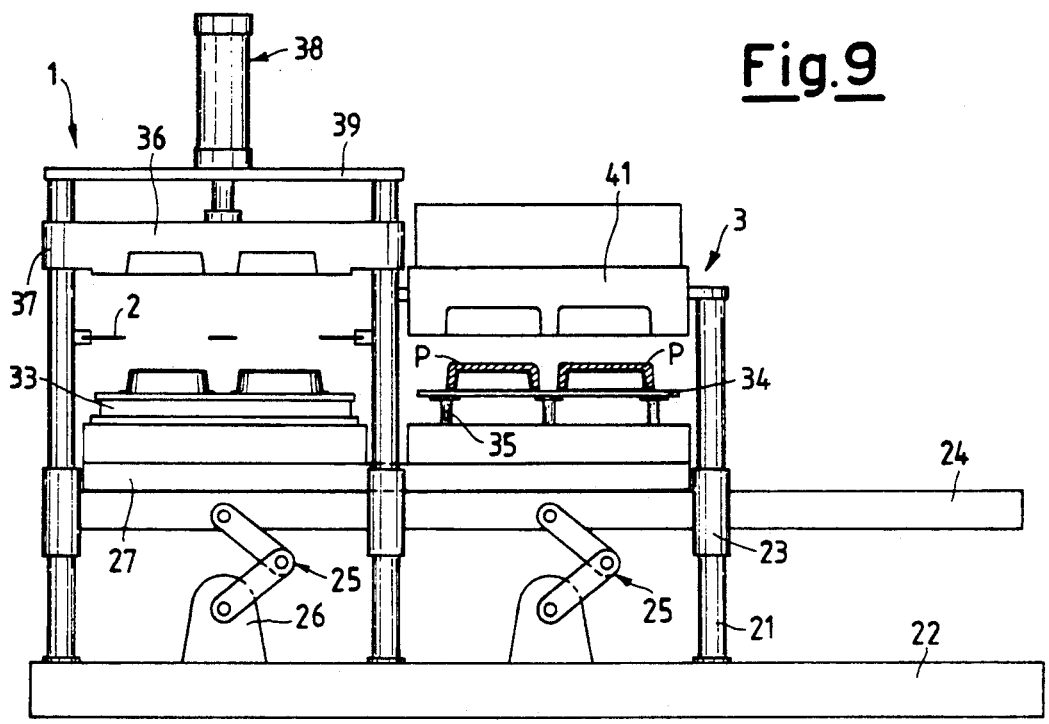

When the rigid material 2 has been preformed, the control center 14 gives the command for separating the half-molds 33 and 36, and simultaneously operates the members for expelling the piece from the half-mold 41. With the consequent lowering of the table 27 the preformed portion is retained on the half-mold 33, while the previously molded piece P is released from the half-mold 41 and remains on the support platform 34 (FIG. 9).

Figure 10:
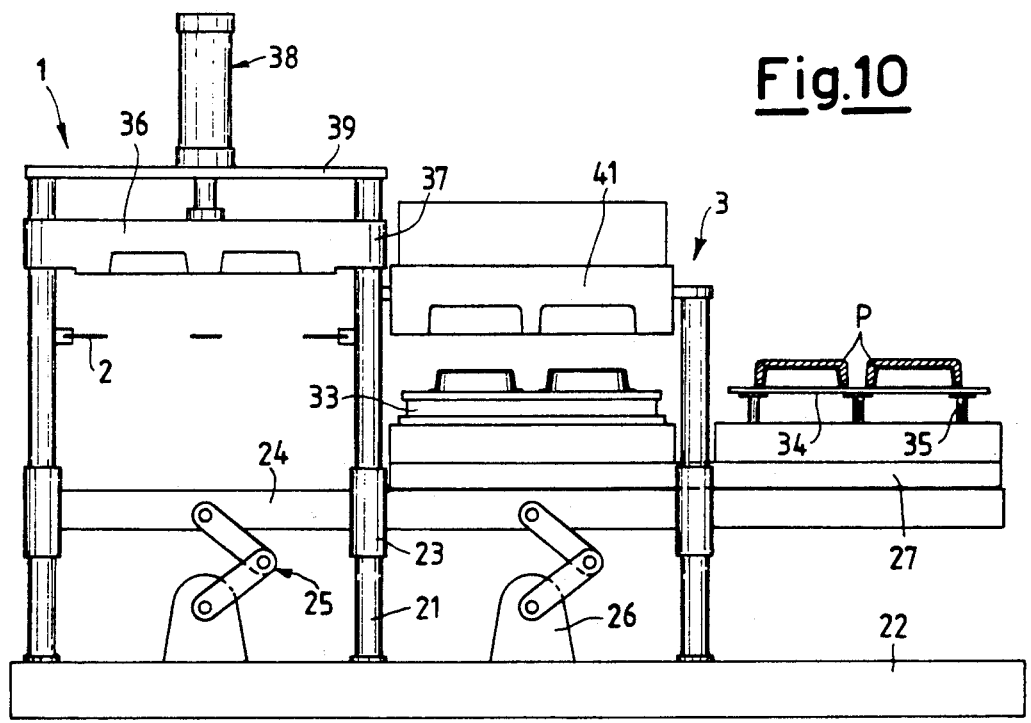

When the table 27 attains its lowered position the control center 14 transmits a command to the motor 28 to move the table 27 towards the right in FIGS. 7 to 12, to position the half-mold 33 with the preformed piece below the fixed half-mold 41 and position the support table 34 within the discharge zone (FIG. 10).

Figure 11:
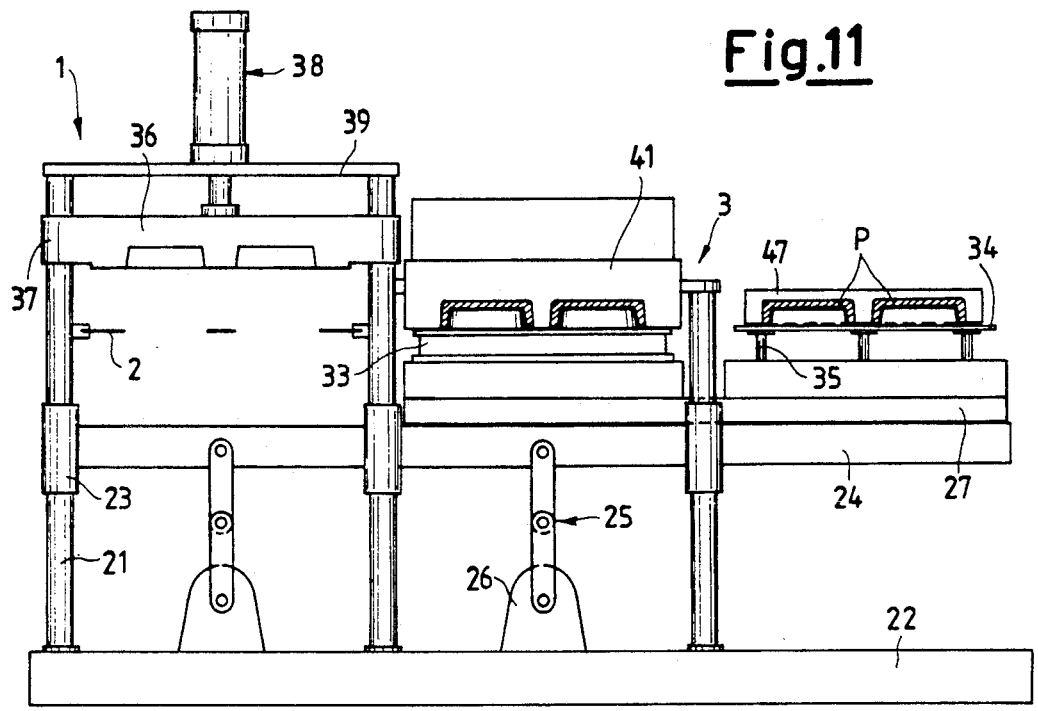

The command for raising the table 27 is now given and the half-molds 33 and 41 come into contact to define the cavity for molding the foamable plastics material by the already known method, the material being injected by the feeders 42 into the molding cavity, and the steam being pulse-fed into the half-mold 41 to sinter the material and bond it to the preformed rigid material, while the pusher 47 is operated to push the prepared piece P, molded during the previous stage, onto the discharge belt 49 (FIG. 11).

Figure 12:
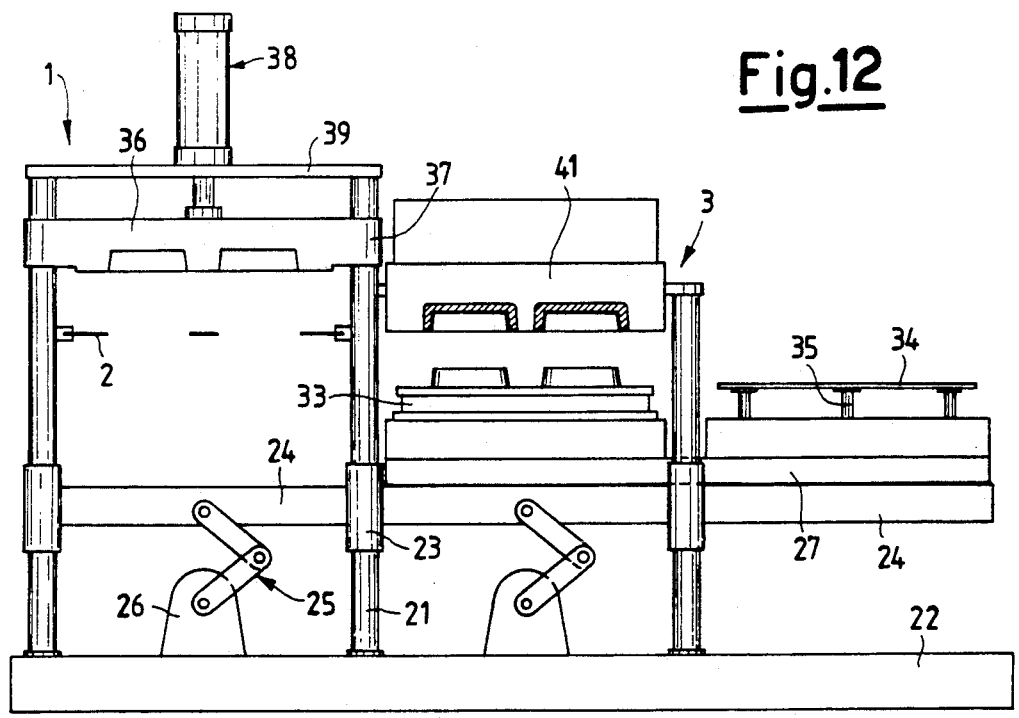

When the molding stage is concluded, the table 27 is lowered and the mold 3 opened, the molding piece P however being retained in the upper half-mold 41, for example by vacuum (FIG. 12). This temporary retention of the piece P in the upper mold 41 can advantageously serve to complete the sintering or cooling operations while the half-mold 33 is moved into the position for preforming the next piece. The strip material 2 has in the meantime been advanced through one step.

It will be apparent that the machine is now in position for a further preforming and molding operation, and the aforedescribed cycle can be repeated.

For these operations a single half-mold is used, to be moved into cooperation with two half-molds (one for preforming and one for molding), the molding being performed on the rigid material portion after it has been already separated from the feed strip, so that the residual material is in no way subjected to transformation or action which can deteriorate it and make it no longer suitable for reuse or recycling. The particular arrangement of the molds in relation to the feed and discharge makes the machine particularly rational and of small overall size. It should be noted that the same results can be obtained by making the half-mold 36 fixed, hence further simplifying the machine. As the preformed material is fed to the molding stage on the same preforming half-mold, additional means for transferring the material between the preforming and molding stages are not required, and in addition the movement of the fed material is sufficient to recover the scrap. Moreover, the machine according to the invention enables bonded material to be molded in which the rigid material is of very small thickness.

The machine achieves high productivity, even though the preforming and molding stages take place not simultaneously but in succession. It should however be noted that the preforming time is much shorter than the molding time, it hence being this latter which substantially determines the duration of a molding cycle. As it is in any event necessary to transfer the material from the preforming to the molding operations, the additional time due to the preforming represents a negligible factor compared with the other advantages of a constructional character which the machine of the invention offers.

As is apparent from the drawings, the machine is suitable for the simultaneous molding of several pieces and/or can be easily adapted in this sense.

Modifications can be made in addition to those already described. For example, the table 27 could be raised hydraulically. The pusher 47 could be operated slightly before or after the molding stage (by arranging the pusher 47 and the belt 49 at the height which the table 27 occupies when in its lowered position). The feed of the rigid material 2 and/or the discharge of the finished pieces P could be in line with the performing and molding stations 1 and 3, respectively. The movement of the table 27 could also be achieved by a rack and pinion system. It would also be possible to reverse the position of the half-molds 33, 36 and 41 in the sense that the horizontally traversable half-mold could be arranged above the other two.

I claim:

1. A machine for forming and molding plastic material to form bonded molded articles comprising:
   a frame;

a preforming station, a molding station and a discharge station in spaced relationship on said frame;

a half-mold movably mounted on said frame for movement into and between said preforming and molding stations;

preforming mold means mounted on said frame in cooperating relationship with said half-mold in said preforming station for forming at least one portion of a plastic sheet material therebetween;

means for feeding said plastic sheet material into a forming position between said half-mold and said preforming mold means;

separating means mounted on said preforming mold means and cooperating with said half-mold for separating at least one formed portion of said plastic sheet material from said plastic sheet material to produce at least one preformed piece in said preforming station;

molding mold means mounted on said frame in said molding station in cooperating relationship with said half-mold in said molding station for providing a mold cavity between said half-mold and said molding mold for molding foamable plastic material onto said at least one preformed piece positioned by said half-mold in said mold cavity;

means for feeding said foamable plastic material to said mold cavity;

means for applying steam in the form of steam pulses to said mold cavity for sintering said foamable plastic material and bonding said foamable plastic material to said at least one preformed piece in said mold cavity to form at least one final molded article;

half-mold positioning means for moving said half-mold between said preforming and molding stations;

mold displacing means for relatively displacing said half-mold and said preforming mold means with respect to each other between a closed forming position and an open position and for relatively displacing said half-mold and said molding mold means with respect to each other between a closed molding position and an open position; and means for removing said at least one final molded article from said machine;

said means being synchronously operable so that said half-mold and said preforming mold means are in said open position when said plastic sheet material and said half-mold are in said forming position in said preforming station and at least one previously made final molded article is retained in said molding mold means, said half-mold and said preforming mold means are in said closed position for forming and separating said at least one preformed piece when said at least one previously made final molded article is released from said molding mold means, said half-mold and said preforming mold means are in said open position in said preforming station when at least one preformed piece is retained on said half-mold and said at least one previously made final molded article is removed from said molding mold means, said half-mold and said molding mold means are in said open position when said half-mold is in said molding station and said at least one previously made final molded article is in said discharge station, said half-mold and said molding mold means are in said closed position when said foamable plastic material and said steam are fed to said mold cavity and said at least one previously made final molded article is discharged from said discharge station, said half-mold and said molding mold means are in said open position thereof when said half-mold is in said molding station and said at least one final molded article is retained on said molding mold means, and said final molded article is retained on said molding means when said half-mold is moved to said preforming station and said plastic sheet material is fed to said forming position in said preforming station to begin another cycle.

2. A machine as claimed in claim 1 wherein said plastic sheet material is in continuous rolled up sheet form and said means for feeding said plastic sheet material comprises:

unwinding roller means mounted on said frame on one side of said preforming station for rotatably supporting a roll of said plastic sheet material to be fed to said forming position;

winding up roller means mounted on said frame on the opposite side of said preforming station from said unwinding roller means for winding up scrap material remaining after forming and separating said at least one preformed piece from said plastic sheet material in said preforming station;

means for rotating at least one of said roller means for intermittently feeding said sheet material to said forming position and feeding remaining scrap material to said winding up roller means; and guide means mounted on said frame for guiding said sheet material during said feeding thereof.

3. A machine as claimed in claim 1 wherein said means for feeding said plastic sheet material comprises:

means for feeding said plastic sheet material in a direction different from the direction of movement of said half-mold between said preforming and molding stations.

4. A machine as claimed in claim 3 wherein:

said direction of feeding said sheet material is perpendicular to said direction of movement of said half-mold.

5. A machine as claimed in claim 1 wherein:

said preforming mold means is mounted on said frame for reciprocating movement toward and away from said half-mold in said preforming station between said open and closed positions of said preforming mold means with said half-mold; and said mold displacing means further comprises power means mounted on said frame and operatively connected to said preforming mold means for reciprocating said preforming mold means.

6. A machine as claimed in claim 1 wherein:

said molding mold means is mounted in fixed position on said frame;

said means for feeding said foamable plastic material comprises a container mounted on said frame for containing said foamable plastic material and conduit means extending from said container through said molding mold means to said mold cavity; and said means for applying steam comprises steam conduit means extending from a source of pulsed steam to said molding mold means.

7. A machine as claimed in claim 1 wherein said half-mold positioning means comprises:

table means mounted on said frame for reciprocal movement; and table drive means mounted on said frame and operatively connected to said table means for reciprocating said table means between said preforming and molding stations.

8. A machine as claimed in claim 7 wherein said mold displacing means comprises:
- a table support movably mounted on said frame in a direction transverse to the reciprocating direction of movement of said table means;
- means for mounting said table means on said table support to facilitate said reciprocating movement of said table means; and
- table support moving means for moving said table support between said open and closed positions of said half-mold in said preforming and molding stations.

9. A machine as claimed in claim 8 and further comprising:
- a resting platform supported on said table means in spaced relationship to said half-mold and movable with said table means between said molding station and said discharge station for receiving said at least one final molded article from said molding means and transferring said final molded article to said discharge station; and
- said means for removing said at least one final molded article comprising discharging means adjacent said discharge station for removing said final molded product from said resting platform at said discharge station.

10. A machine as claimed in claim 5 wherein said half-mold positioning means comprises:
- table means mounted on said frame for reciprocal movement; and
- table drive means mounted on said frame and operatively connected to said table means for reciprocating said table means between said preforming and molding stations.

11. A machine as claimed in claim 10 wherein said mold displacing means comprises:
- a table support movably mounted on said frame in a direction transverse to the reciprocating direction of movement of said table means;
- means for mounting said table means on said table support to facilitate said reciprocating movement of said table means; and
- table support moving means for moving said table support between said open and closed positions of said half-mold in said preforming and molding stations.

12. A machine as claimed in claim 8 wherein:
- said table support moving means comprises at least one toggle mechanism; and
- means for operating said at least one toggle mechanism.

13. A machine as claimed in claim 1 wherein said separating means comprises:
- cutting means for cutting said plastic sheet material along the periphery of said at least one preformed piece.

14. A machine as claimed in claim 1 wherein said means for removing said at least one final molded article from said machine comprises:
- pusher means adjacent said discharge station and movable in a direction substantially transverse to the direction of movement of said half-mold positioning means between a retracted position and a discharging position for engaging said at least one final molded article at said discharge station and pushing said at least one final molded article out of said discharge station.

15. A machine as claimed in claim 9 wherein said separating means comprises:
- cutting means for cutting said plastic sheet material along the periphery of said at least one preformed piece.

16. A machine as claimed in claim 1 and further comprising:
- preheater means movably mounted on said frame adjacent said preforming station for movement between a retracted position outside of said preforming station and a heating position for heating said plastic sheet material in said forming position prior to forming said plastic sheet material between said half-mold and said preforming mold means.

17. A machine as claimed in claim 15 wherein:
- preheater means is movably mounted on said frame for movement between an operating position overlying said plastics material in said forming position and a retracted position laterally offset from said forming position.

18. A machine as claimed in claim 16 wherein:
- said preheater means comprises an infrared heating device.

* * * * *